United States Patent [19]

Wenger

[11] Patent Number: 4,574,185

[45] Date of Patent: Mar. 4, 1986

[54] TEMPERATURE CONTROL CIRCUITRY FOR A COOKING APPARATUS

[76] Inventor: Frédy Wenger, Chemin de l'Ormet 17A, 1024 Ecublens, Switzerland

[21] Appl. No.: 671,552

[22] Filed: Nov. 14, 1984

[30] Foreign Application Priority Data

Nov. 16, 1983 [CH] Switzerland .................. 6148/83

[51] Int. Cl.⁴ .............................................. H05B 10/02
[52] U.S. Cl. .................................... 219/494; 99/331; 219/441; 219/512
[58] Field of Search ............... 219/431, 435, 437, 438, 219/439, 440, 441, 442, 489, 492, 493, 494, 510, 512; 99/325, 329 R, 331, 337

[56] References Cited

U.S. PATENT DOCUMENTS 3,894,483  7/1975  Anetsberger ........................ 99/331
3,919,523  11/1975  Wadia et al. ....................... 219/494
4,217,482  8/1980  Wadia ............................. 219/494

Primary Examiner—Volodymyr Y. Mayewsky
Attorney, Agent, or Firm—Robert E. Burns; Emmanuel J. Lobato; Bruce L. Adams

[57] ABSTRACT

The deep fryer comprises an oil tank, an immersed heater (3) controlled by a thermostat (2) which disconnects the heater when the oil reaches a given temperature. The thermostat comprises an auxiliary switch (a) which controls a signal light (a-1) or some other signalling means operating at a temperature 5° to 10° C. below the operating temperature of the main switch (b) which controls the heater. One thus anticipates the time when the required temperature is reached. By immersing the product to be fried at that moment, one eliminates the inertia effect of the thermostat, prevents the disconnecting of the heater, and reduces the drop in temperature. The duration of the cooking cycle is reduced.

5 Claims, 4 Drawing Figures

TEMPERATURE CONTROL CIRCUITRY FOR A COOKING APPARATUS

BACKGROUND OF THE INVENTION

The present invention relates to a deep fryer comprising an oil tank, a movable basket intended to receive the product to be fried, an immersed heater controlled by a thermostat which turns the heater off when the oil reaches a given temperature, and means for reducing the drop in temperature which is due to the response time of the thermostat upon the immersion of the basket.

The heater may be an electric heater or a gas heater. The different foods which can be fried in such deep fryers must be fried at suitable temperatures which differ from one food to another. The operator selects the proper temperature on the dial of the thermostat and this thermostat is entrusted with maintaining the oil at this temperature by connecting and disconnecting the circuit of the heater. A signal light connected in parallel with the heater makes it possible for the user to know when the desired temperature has been reached. As soon as the thermostat disconnects the heater, the signal light goes out and the user can then immerse the basket containing the foods to be fried into the oil.

Today, greater and greater use is being made of frozen foods, such as fried potatoes, croquettes, fish, chicken legs, etc. They are immersed in hot oil while they are still frozen, that is to say at a temperature of from $-17°$ C. to $-25°$ C. This immersion results in a sudden large drop in the temperature of the oil. This drop is all the greater since the response time of the capillary thermostats used in practically all deep fryers is about 30 to 40 seconds. It has already been proposed to limit this drop in temperature by providing the fryer with an auxiliary time switch (U.S. Pat. No. 3,894,483) which is turned on simultaneously with the placing in operation of the basket immersion means and neutralizes the thermostat by starting the heating. The thermostat then takes over from the auxiliary time switch. The drop in temperature is thus reduced and a saving of time and energy is obtained.

SUMMARY OF THE INVENTION

The object of the present invention is further to improve the saving in time and energy.

The deep fryer of the present invention makes it possible to immerse the basket, with food contents therein, before the temperature of disconnection of the heater is reached, so that the heater remains on and not only are the successive turnings on and off of the heater eliminated but a considerable amount of time is gained in a cooking cycle. Furthermore, the maximum temperature is lowered, which improves the quality of the fried food.

The signalling means preferably consist of a light or bell controlled by an additional switch of the operating thermostat.

BRIEF DESCRIPTION OF THE DRAWING

The invention will be better understood from the description of embodiments given below with reference to the accompanying drawing.

DESCRIPTION OF THE PREFERRED EMBODIMENT

Figure 1:
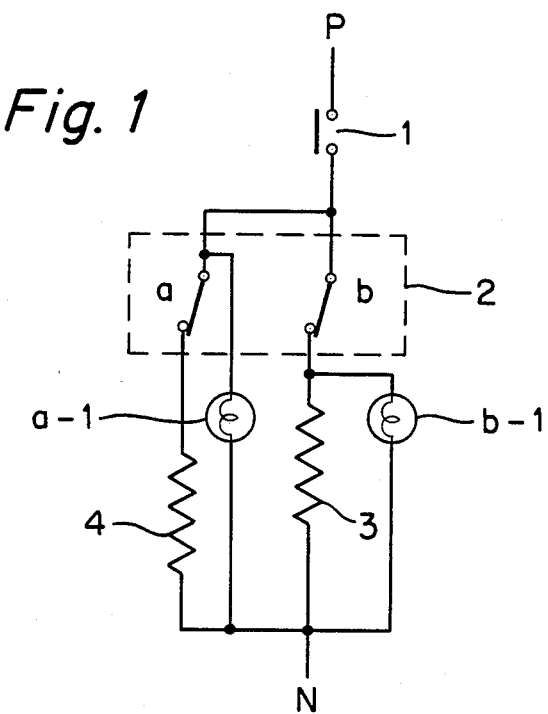
FIG. 1 is a wiring diagram of a first embodiment.

The diagram of FIG. 1 shows a main switch 1 mounted between a phase P and the neutral N, a thermostat 2 of conventional type comprising two switches having rest contacts a and b, a heater 3, a signal light b-1 connected in parallel to the heater and indicating when it is on that this heater is fed with current, and a second signal light a-1 connected in parallel to the contact a and to a shunt resistor 4.

The thermostat 2 can be adjusted within a range of about 150° to 200° C. The two switches having contacts a and b are automatically driven by the mechanism of the thermostat itself, this mechanism being so adjusted that the contact a opens at a temperature which is 5° to 7° below the opening temperature of the contact b, which is in charge of regulating the temperature of the oil. When the contact a opens, the shunt resistor 4 is no longer connected and the light a-1 lights up, indicating to the user that the operating temperature is going to be reached imminently and that he can immerse the basket. As will be evident from the following diagrams, the signal light b-1 is optional since, contrary to the deep fryers of the prior art, the heater is to be continuously connected.

Figure 2:
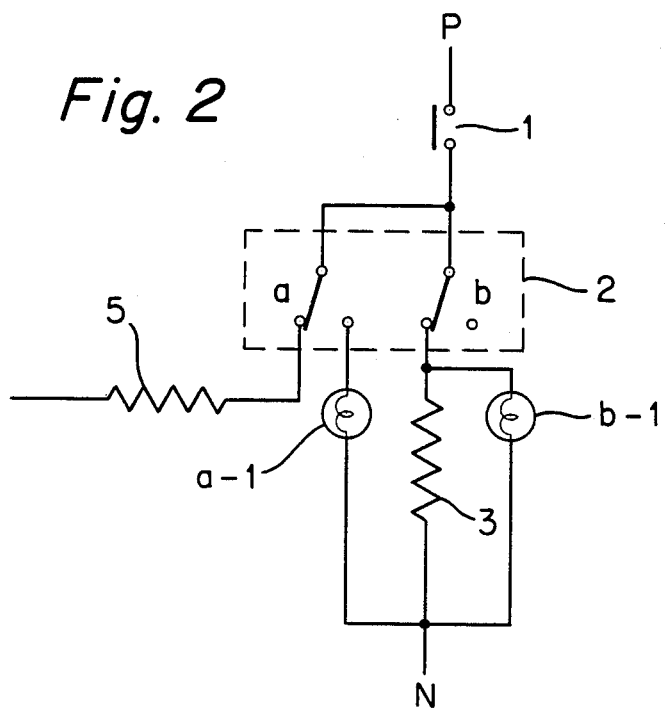
FIG. 2 is a wiring diagram of a second embodiment.

In the embodiment shown in FIG. 2, the thermostat 2 has two switch contacts a and b. At rest, the circuit of the signal light a-1 is open.

The response time of the thermostat 2 is about 30 to 40 seconds, which means that after immersion of the basket containing the food into the oil cooking medium, the heater 3 is connected only after 30 to 40 seconds. This relatively long response time is due to three factors. The first is the inertia of the thermostat. The second is the location of the bulb of the thermostat, which is necessarily located in the vicinity of the heater in order to avoid the temperature being exceeded as it rises, which is a requirement made by the official control institutes. The third factor consists of the release of heat accumulated in the mass of the heater due to the fact that the center of the heating bars reaches a temperature of 300° to 400° C. After the disconnecting of the heating circuit, the heater therefore continues to heat the oil and the sensor in the oil cooking medium of the thermostat for a certain period of time.

The signal light a-1 lights up about 15 seconds before the disconnecting of the heater. By introducing the basket as soon as the light a-1 lights up, one avoids the disconnecting of the thermostat and the interruption of the feeding of heat by the heater.

In accordance, for instance, with the instructions of the producers of frozen fried potatoes, they should be prepared as follows:

1. Immerse the frozen fried potatoes into oil of 190°–200° C. for one minute.

2. Remove the fried potatoes. Heat the oil again to a temperature of 190°–200° C.

3. Place the fried potatoes back in the oil for one minute in order to complete the cooking.

Figure 3:
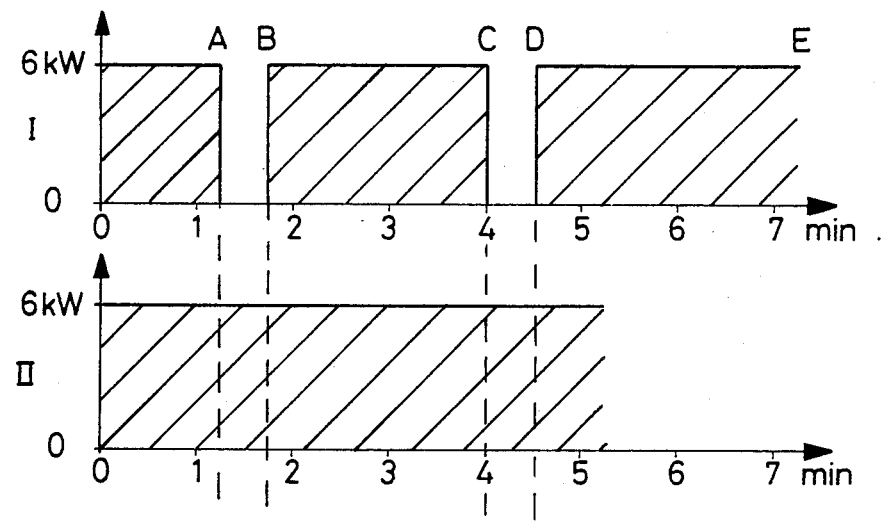
FIG. 3 are comparative diagrams between a conventional fryer and a fryer according to the invention with respect to the connecting of the heater.

Diagram I, FIG. 3, illustrates the operation of the heater as a function of time, indicated in minutes, for the deep frying of frozen foods in accordance with the above instructions.

Figure 4:
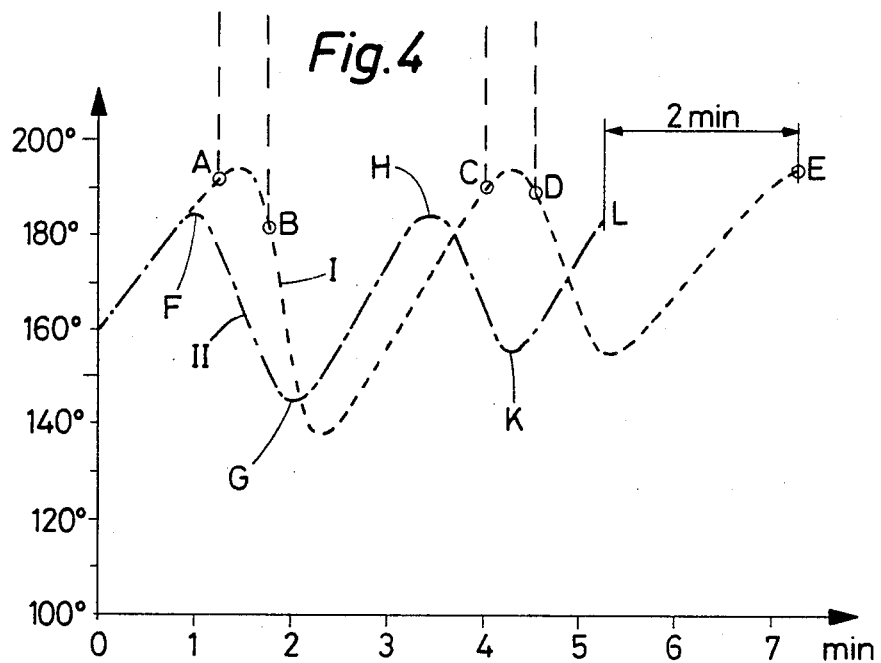
FIG. 4 is a comparative diagram between a conventional fryer and a fryer according to the invention with respect to the temperature and duration of the operating cycle.

The corresponding variation in the temperature is represented in FIG. 4 by the two curves I and II.

In a deep fryer in accordance with the prior art (I), the thermostat disconnects the heater initially at a time A when the temperature of the oil has reached about 190° C. The basket is then immersed for one minute. The temperature of the oil immediately drops rapidly, but the thermostat reconnects only at the end of 30 to 40 seconds at the time B. The temperature rises again until the thermostat again disconnects at the time C. The basket is then again immersed for one minute. The temperature of the oil drops and the thermostat again turns on the heater after 30 to 40 seconds at point D. At the end of one minute the cooking is finished and the basket is removed. The temperature of the oil can rise to the point of disconnection E.

With the deep fryer of the invention, the heater, in principle, remains on continuously for the entire heating and cooking cycle. In fact, when the temperature reaches about 185° C., the contact a operates and the light a-1 lights up (point F). The user then immerses the basket containing the frozen foods and the temperature drops abruptly. At the end of a minute (point G), the basket is removed and the temperature rises again. When it again reaches a temperature of about 185° C., the user can again immerse the basket for the cooking (point H). At the end of a minute, the basket is removed (point K) and the temperature of the oil rises again, the lighting up of the light a-1 (point L) indicating that a new batch of frozen foods can be immersed. It is noted that not only are the successive turnings on and off of the heater eliminated but one gains about 2 minutes in the cooking cycle. Furthermore, despite the introduction of the foods at an oil temperature less than the required temperature, the drop in temperature is less and the wait to again reach the desired temperature is shorter. It is furthermore noted that during the period of 60 seconds during which the foods are in the oil, the heater is on for 20 to 30 seconds in the case of a conventional fryer while it is on for 60 seconds in the case of the fryer of the invention. The heat provided by the heater is therefore practically doubled.

In conclusion, the capacity of the deep fryer is increased by about 20% and the quality of the fried foods is improved since the maximum temperature of the oil is lowered.

If the fryer is equipped with an electromechanical device for the lowering and raising of the basket, it is possible to provide a blocking device which prevents the lowering of the basket before the temperature of the oil is sufficient, that is to say before the temperature curve II has reached one of the points F or H. For this purpose, the rest terminal of the switch a of the circuit of FIG. 2 can be used to supply power to an electromagnetic lock 5.

I claim:

1. In a cooking apparatus having a liquid cooking medium, circuitry comprising a first electrically controlled indicator operable to sensibly indicate when a preselected temperature obtains in the liquid cooking medium, a second electrically controlled indicator operable to sensibly indicate when a given temperature below said preselected temperature obtains in the liquid cooking medium, a thermostatic device operable automatically in dependence upon temperatures of the liquid cooking medium having a normally initially closed first switch operable automatically to an open position in dependence upon temperatures detected in the liquid cooking medium connected to open automatically and cause the first indicator to sensibly indicate when the preselected temperature obtains and operable automatically to a closed position when the temperature is below said preselected temperature, and a second switch operable automatically to closed and open positions in dependence upon temperatures detected in the liquid cooking medium and connected to operate automatically to a position to cause the second indicator to sensibly indicate that the given temperature below said preselected temperature obtains, means for heating automatically controlling the application of heat to the liquid cooking medium connected to be controlled electrically by said normally initially closed first switch for effectively applying of heat to the liquid cooking medium, and electrical connections under control of the first switch for automatically disconnecting the last-mentioned means when the temperature of said liquid cooking medium is above the preselected temperature and for connecting said last-mentioned means when the temperature of the liquid cooking medium is below said preselected temperature.

2. In a cooking apparatus according to claim 1, in which said means for heating and automatically controlling the application of heat comprises a heating resistor connected to the first switch.

3. In a cooking apparatus according to claim 2, in which said heating resistor is connected in series with said first switch.

4. In a cooking apparatus according to claim 1, in which said first and second indicator are lights connected in parallel.

5. In a cooking apparatus having a liquid cooking medium, circuitry comprising an electrically controlled indicator operable to sensibly indicate when a given temperature below a preselected temperature obtains in the liquid cooking medium, a thermostatic device operable automatically in dependence upon temperatures of the liquid cooking medium having a normally initially closed first switch operable automatically to an open and closed position in dependence upon temperatures detected in the liquid cooking medium connected to open automatically when the preselected temperature obtains and operable automatically to a closed position when the temperature is below said preselected temperature, and a second switch operable automatically to closed and open positions in dependence upon temperatures detected in the liquid cooking medium and connected to operate automatically to a position to cause the indicator to sensibly indicate that the given temperature below said preselected temperature obtains, means for heating automatically controlling the application of heat to the liquid cooking medium connected to be controlled electrically by said normally initially closed first switch for effectively applying of heat to the liquid cooking medium, and electrical connections under control of the first switch for automatically disconnecting the last-mentioned means when the temperature of said liquid cooking medium is above the preselected temperature and for connecting said last-mentioned means when the temperature of the liquid cooking medium is below said preselected temperature.

* * * * *